United States Patent [19]

Huber

[11] 4,140,435
[45] Feb. 20, 1979

[54] REVERSIBLE FAN

[76] Inventor: Herman L. Huber, 2103 Hershey Rd., Erie, Pa. 16509

[21] Appl. No.: 800,649

[22] Filed: May 26, 1977

[51] Int. Cl.² ............................................. F04D 29/36
[52] U.S. Cl. ...................................................... 416/206
[58] Field of Search ........................................ 416/206

[56] References Cited

U.S. PATENT DOCUMENTS

| 1,479,895 | 1/1924 | Colby | 416/206 |
| 1,509,286 | 9/1924 | Colby | 416/208 X |
| 1,685,323 | 9/1928 | Hansen | 416/206 |
| 3,174,553 | 3/1965 | Spears | 416/206 |
| 3,428,244 | 2/1969 | Palmer | 416/221 X |
| 3,799,699 | 3/1974 | Master et al. | 416/206 |
| 3,904,314 | 9/1975 | Pedersen | 416/206 X |

FOREIGN PATENT DOCUMENTS

| 646509 | 8/1962 | Canada | 416/206 |
| 727968 | 11/1942 | Fed. Rep. of Germany | 416/206 |
| 1189060 | 9/1959 | France | 416/206 |

Primary Examiner—Everette A. Powell, Jr.
Attorney, Agent, or Firm—Charles L. Lovercheck

[57] ABSTRACT

A fan, with reversible blades, having a hub receiving the stem of the blades and an inner retaining ring, which has outwardly extending projections, supported concentric with the hub. A helical spring is received in, and actually extends into, a blind hole in each stem, and the inner end of the spring rests on the retaining ring at the projection urging the blades outward.

4 Claims, 3 Drawing Figures

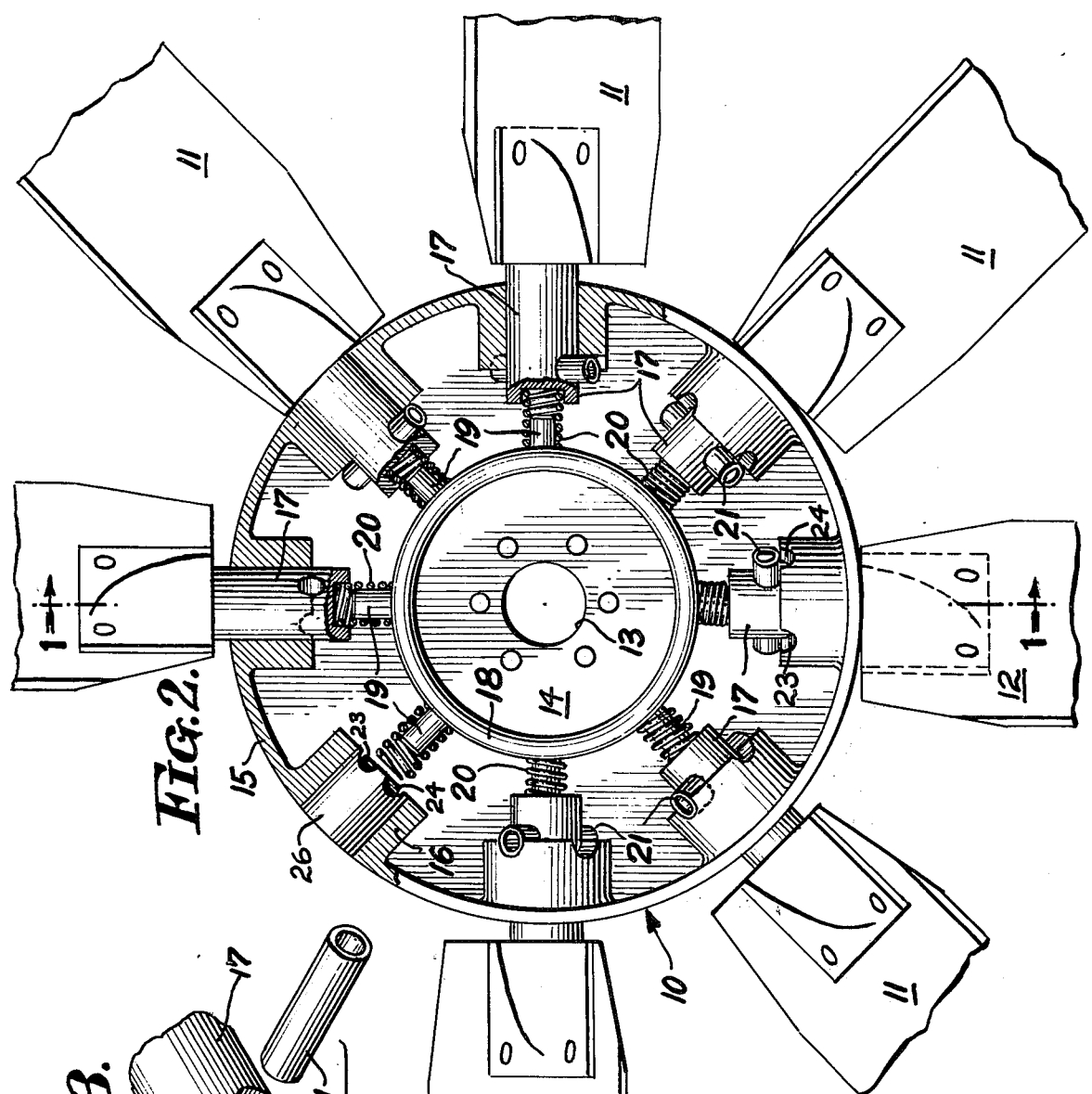
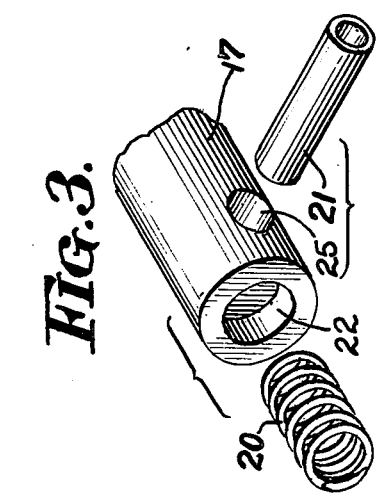
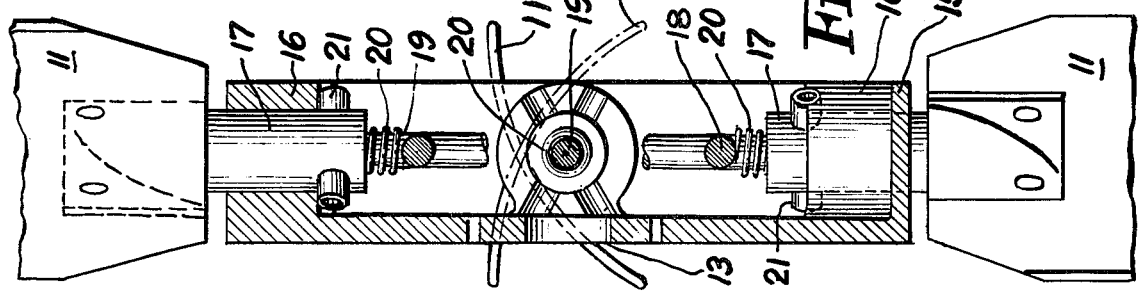

REVERSIBLE FAN

OBJECTS OF THE INVENTION

It is an object of the invention to provide an improved reversible fan.

Another object of the invention is to provide an improved port for the blades of the reversible fan.

Another object of the invention is to provide a reversible fan that is simple in construction, economical to manufacture, and simple in operation to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a partial side view of the fan according to the invention.

FIG. 2 is a rear view of the fan, shown in FIG. 1.

FIG. 3 is an exploded view of the blade stem assembly.

Now, with more particular reference to the drawings, the fan is generally indicated at 10 having reversible blades 11, which may be moved from a first position, shown in full lines in FIG. 1 at 11, to a second position, shown in phantom lines at 12 in FIG. 1. The second position is also shown at 12 in FIG. 2.

The fan hub is indicated generally at 14. The fan hub has a central shaft-receiving member 13 which is adapted to have a fan pulley supported on it in a manner familiar to those skilled in the art. The hub 14 has a peripheral axially extending flange 15, which has a plurality of inwardly extending nipples 16 on it. These nipples each have a bore 26 that receives the stem 17 of a blade 11. The stem 17 of each blade has a blind hole 22 formed in its inner end, and each blind hole receives one of the springs 20. The springs 20 each have their inner end resting on the internal locking ring 18 which has the spaced projections 19 on it. The projections 19 and the holes 22 retain the springs 20. The locking ring 18 is held in place by the springs 20.

Each nipple 16 has diametrically extending notches 23 and 24 which can receive one of the pins 21. The pin 21 is received in a hole 25 on the inner end of the stems 17. The springs 20 urge the stems 17 outward so that the pins 21 rest in one of the notches. When the pin 21 is resting in the notch 23, the blade 11 is held in the forward operating position. When the pin 21 is resting in the notch 24, the blade 11 is held in the reverse operating position 12.

The blades on the fan can be supported in a first position to draw the cooling air through the radiator thereby heating it and driving it back over the operator of a tractor or the like, or the blades can be reversed to drive the air forwardly through the radiator of the tractor.

If it is desired to change the flow of air from the forward to the reverse operating position, for example, the operator will grasp each blade 11 individually and force it inwardly against the force of the spring 20. This will move the pin 21 out of the notch 23 in the end of the nipple 16. The operator can then rotate the fan blades to the position of notch 24. When the blade is released, the spring will force the blade outwardly so that the pin will rest in the notch 24 in the end of the nipple 16.

In FIG. 2 at the 10:30 position, the spring 20 is shown in place over the pin 19. At the 12:00 position, the blade 11 is shown with the stem 17 inserted in the bore 26 of the nipple 16. The spring 20 is shown with its outer end in hole 22. At the 1:30 position, the pin 21 is shown inserted in the hole 25 of the stem 17. The blade 11 is shown pushed inward compressing the spring 20. The ends of pin 21 extend beyond the stem 17 and do not rest in the notches of the nipple 16. At the 3:00 position, the parts are in the forward operating position with the blade pushed outward and with the ends of pin 21 located in notch 23. At the 4:30 position, the blade is shown pressed inward for changing the orientation of the blade to reverse function with the ends of pin 21 moved clear of the notches of nipple 16. At the 6:00 position, the parts are shown aligned to operate in reverse function mode with the pin 21 aligned to move outwardly into the notch 24 in the nipple 16.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A fan, having blades adapted to operate in at least two positions comprising, a hub with supporting means adapted to be supported on an engine, stems on said blades received in said hub, an annular retaining ring disposed inside said hub and located closely adjacent the inner end of the stems and generally concentric thereto, first retaining means comprising a plurality of radially extending means on said retaining ring, helical springs supported between said ring and said blades retained by said first retaining means supporting said retaining ring, said stems resting on said helical springs and said helical springs resting on said ring and circumferentially spaced projections on the outer periphery of said annular retaining ring, the inner ends of each said spring receiving a said projection, said helical springs engaging said stems urging said stems radially outward and holding said retaining ring in generally concentric relation to said hub, second retaining means adapted to hold said blades in any one of said positions whereby said springs urge the said stems into engagement with said second retaining means, and said helical springs are compressed to disengage said second retaining means to change the position of said blades.

2. The fan recited in claim 1 wherein said hub was a cylindrical body having said nipples extending inwardly thereof, and a radially inwardly directed flange on one end of said body, said flange having spaced holes therein for attaching it to an engine.

3. The fan recited in claim 1 wherein said means on said first ring supporting it on a driving member comprising, an inwardly directed flange integrally attached to said first ring and having spaced holes therein for bolting it to a driving member.

4. The fan recited in claim 1 wherein said limit means comprises, a plurality of pins, each said pin extending diametrically through the inner end of a set hub and adapted to engage the inner end of a said boss.

* * * * *